US012076881B2

(12) United States Patent
Chang

(10) Patent No.: US 12,076,881 B2
(45) Date of Patent: Sep. 3, 2024

(54) DELIVERY CHAIN APPARATUS OF A WOOD-WORKING MACHINE WITH SAW BLADES

(71) Applicant: KUANG YUNG MACHINERY CO., LTD., Taichung (TW)

(72) Inventor: Chih-Chou Chang, Taichung (TW)

(73) Assignee: KUANG YUNG MACHINERY CO., LTD., Taichung (TW)

( * ) Notice: Subject to any disclaimer, the term of this patent is extended or adjusted under 35 U.S.C. 154(b) by 287 days.

(21) Appl. No.: 17/696,803

(22) Filed: Mar. 16, 2022

(65) Prior Publication Data

US 2023/0294322 A1 Sep. 21, 2023

(51) Int. Cl.
*B27B 31/00* (2006.01)
*B27B 7/04* (2006.01)

(52) U.S. Cl.
CPC .............. *B27B 31/006* (2013.01); *B27B 7/04* (2013.01)

(58) Field of Classification Search
CPC ........... B27B 31/006; B27B 7/04; B27B 5/04; B26D 7/088; B26D 7/18; B26D 1/20; B65G 15/52; B65G 23/44; B65G 2207/76
USPC ........................................ 83/425.3, 469, 481
See application file for complete search history.

(56) References Cited

U.S. PATENT DOCUMENTS 4,553,663 A * 11/1985 Johnson ................. A01D 61/02 198/848
2008/0083312 A1 * 4/2008 Zschoche ............... B26D 7/088 29/700
2008/0257451 A1 * 10/2008 Borne .................. B65G 47/841 144/1.1

FOREIGN PATENT DOCUMENTS

CN 205837797 U * 12/2016 ............. B65G 15/52

* cited by examiner

*Primary Examiner* — Ghassem Alie
(74) *Attorney, Agent, or Firm* — MUNCY, GEISSLER, OLDS & LOWE, PC

(57) ABSTRACT

A delivery chain apparatus of wood-working machine with saw blades is disclosed. The delivery chain apparatus is formed into a loop by pivoting track units. The surface of each track unit is provided at least with a chain, each chain is locked on the track unit, some chains are made of metal, and the surface of a metallic chain is provided with teeth. The delivery device revolves on a desktop by power to send wood boards below the saw blades. The present invention is characterized in that the chains on the track units of the delivery device are combination of non-skid chains and the metallic chains, with the non-skid chains being made of rubber.

2 Claims, 14 Drawing Sheets

DELIVERY CHAIN APPARATUS OF A WOOD-WORKING MACHINE WITH SAW BLADES

BACKGROUND OF THE INVENTION a) Field of the Invention

The present invention relates to a delivery chain apparatus of wood-working machine with saw blades, and more particularly to a delivery chain apparatus of wood-working machine with saw blades, wherein conventional all metallic chains or conventional all rubber chains are replaced by combination of non-skid chains and metallic chains, with the non-skid chains and the metallic chains being arranged next to each other, alternatingly, or symmetrically up-down and left-right, thereby achieving the effect of anti-slip and anti-vibration, and extending the lifetime of use of the non-skid chains.

b) Description of the Prior Art

As shown in FIG. 1 and FIG. 2, a conventional wood-working machine with saw blades includes primarily a table 1. The table 1 is provided primarily with a desktop 2, a control device 3, a main shaft 4, saw blades 5 and a delivery device 6 (in FIG. 2, a shield 7 above the table 1 was dismantled). A power device transmits power to the main shaft 4, and the saw blades 5 are mounted on the main shaft 4 to rotate. A lower side of the saw blades 5 is the delivery device 6, and the delivery device 6 sends wood boards below the saw blades 5. The delivery device 6 is capable of stabilizing and sending the wood boards, the wood boards are pressed down on the delivery device 6 by the saw blades 5, and the delivery device 6 can revolve on the desktop 2 by power.

Referring to FIG. 3, the delivery device 6 of the conventional wood-working machine with saw blades is formed into a loop by pivoting track units 61. A surface of each track unit 61 is provided with a chain 8, and each chain 8 is locked on the track unit 61, allowing the delivery device 6 to send the wood boards onto the desktop 2 like tracks. The chain 8 is forged with metal, and a surface of the chain 8 is arranged with teeth 81. By the contact of teeth 81 on the chain 8 with the wood boards, the wood boards can be sent stably on the desktop 2 and below the saw blades 5, to be cut into required sizes.

The conventional wood-working machine with saw blades can easily result in following shortcomings that:

1. It is easy to form saw marks 91 on the wood boards 90 (as shown in FIG. 4), without forming a complete cutting plane. The wood boards 90 are contacted only by the teeth 81 on the surface of chain 8 and are suffered from strong vibration after being delivered (the error generated from vibration is smaller for a single saw blade). As the wood boards 90 are suffered from vibration, it easy to result in uneven saw marks 91 on the cutting plane in cutting the wood boards 90. Therefore, a secondary processing is required to re-smooth the saw marks 91 on the cutting plane.
2. After using the chain 8 for a long time, as the wood boards 90 are only contacted by the teeth 81 on the surface of chain 8, the teeth 81 may be worn down easily and changed into an obtuse angle from an acute angle, even unable to engage with the wood boards 90; therefore, the probability of forming the saw marks 91 on the cutting plane upon cutting the wood boards 90 is increased considerably.
3. It needs time and labor to re-smooth the saw marks 91 on the wood boards 90, and the size that was set up originally is reduced and does not comply with the requirement.

As shown in FIG. 5, a delivery device 10 of the wood-working machine with saw blades was provided by some wood-working industry, wherein metallic chains on a track unit 11 are replaced by rubber chains 12. As the rubber chain 12 is elastic and slightly compressible, it is provided with a good anti-slip effect. Therefore, when the wood boards are pressed down by the saw blades, the rubber chains 12 sustain with the pressure from the wood boards and are good in contact, which can resist vibration and can sustain with the pressure. Accordingly, the probability of forming the saw marks on the cutting plane upon cutting the wood boards is decreased. However, as the surface of delivery device 10 is totally mounted with the rubber chains 12, the rubber chains 12 can be worn down easily to reduce the lifetime of use. In addition, after using the delivery device 10 for a while (short time), the industry needs to completely replace the worn-down rubber chains 12 by the new rubber chains 12; thus, the industry will not use this kind of product again.

As the contact area of the teeth 81 on the surface of metallic chains 8 with the wood board 90 is small, the saw marks 91 can be formed easily on the wood board 90 by the vibration from the saw blades 5. Therefore, some industry replaced the metallic chains 8 with the rubber chains 12. However, the rubber chains 12 are not tolerant to wear-down and have a short lifetime of use, needing to be replaced constantly. In addition, it wastes a lot of manpower to replace the rubber chains 12; thus, the industry would not like to use them anymore.

SUMMARY OF THE INVENTION

Accordingly, the present invention is a delivery chain apparatus of wood-working machine with saw blades, wherein a table includes primarily a desktop, a control device, a main shaft, saw blades, and a delivery device. A power device transmits power to the main shaft, and the saw blades are mounted on the main shaft. A lower side of the saw blades is the delivery device, and the delivery device is formed into a loop by pivoting strip-like track units. A surface of each track unit is provided at least with a chain, and each chain is locked on the track unit. Some chains are made of metal, and the surface of the metallic chain is provided with the teeth. The delivery device revolves on the desktop by power and sends the wood boards below the saw blades. The present invention is characterized in that a chain seat above the track unit of the delivery device is the combination of non-skid chains and metallic chains, with the non-skid chains being made of rubber.

A primary object of the present invention is to disclose a delivery chain apparatus of wood-working machine with saw blades, wherein the conventional all metallic chains or the conventional all rubber chains are replaced by the combination of non-skid chains and metallic chains, which achieves the effect of anti-slip and anti-vibration and extends the lifetime of use of the non-skid chains.

A second object of the present invention is to disclose a delivery chain apparatus of wood-working machine with saw blades, wherein the non-skid chains and the metallic chains are arranged next to each other to achieve the effect of anti-slip and anti-vibration and extend the lifetime of use of the non-skid chains.

A third object of the present invention is to disclose a delivery chain apparatus of wood-working machine with saw blades, wherein the non-skid chains and the metallic chains are arranged alternatingly to achieve the effect of anti-slip and anti-vibration and extend the lifetime of use of the non-skid chains.

A fourth object of the present invention is to disclose a delivery chain apparatus of wood-working machine with saw blades, wherein the non-skid chains and the metallic chains are arranged symmetrically up-down and left-right to achieve the effect of anti-slip and anti-vibration and extend the lifetime of use of the non-skid chains.

To enable a further understanding of the said objectives and the technological methods of the invention herein, the brief description of the drawings below is followed by the detailed description of the preferred embodiments.

DETAILED DESCRIPTION OF THE PREFERRED EMBODIMENTS

Figure 1:
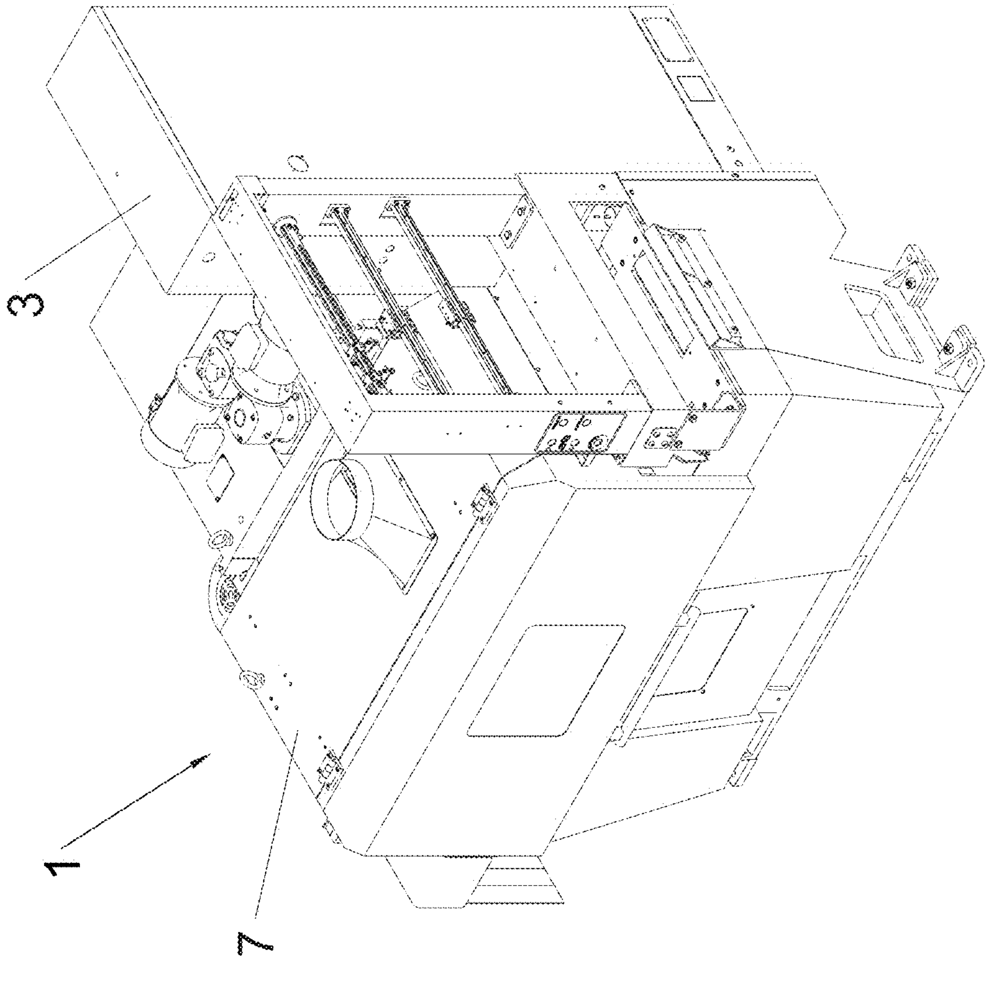
FIG. 1 Prior Art
FIG. 1 shows a three-dimensional external view of a conventional wood-working machine with saw blades.
Figure 2:
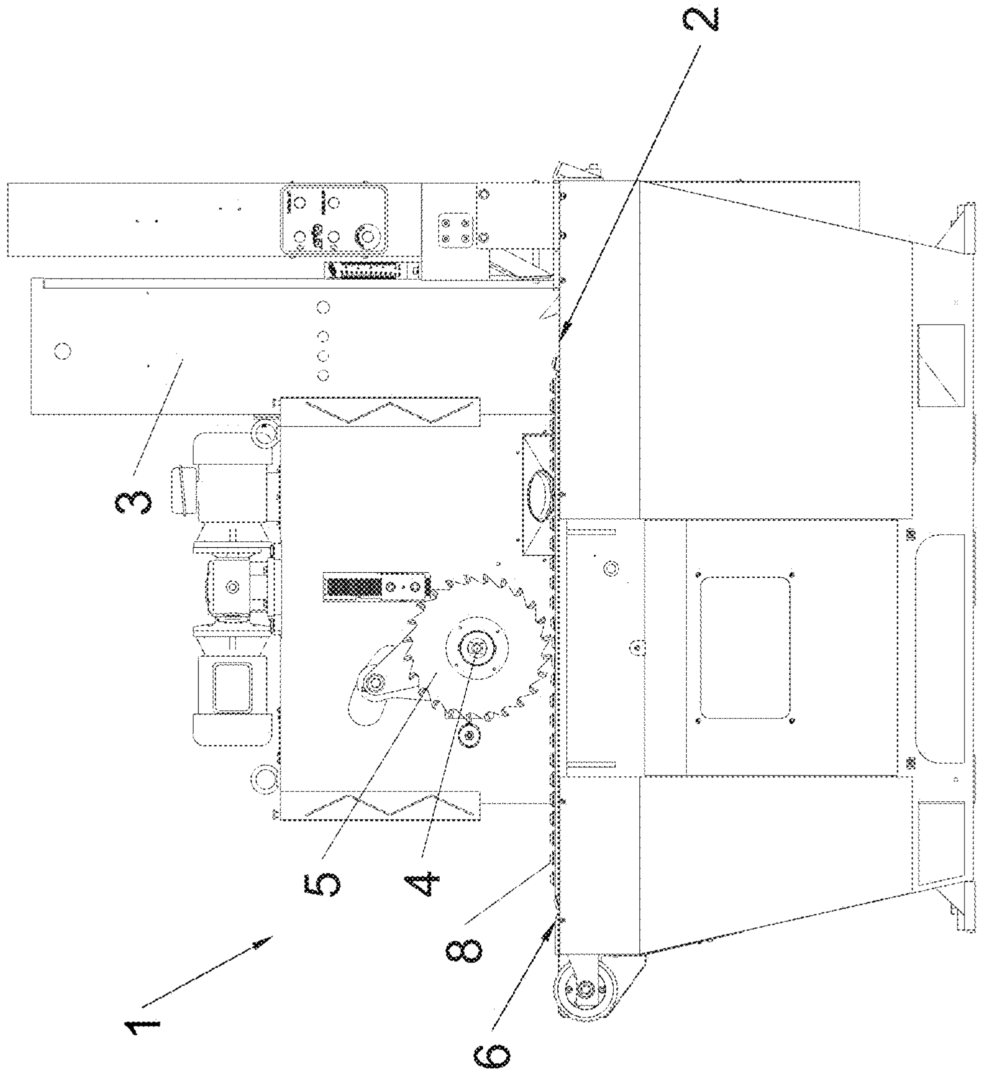
FIG.2 Prior Art
FIG. 2 shows a planar view of the conventional wood-working machine with saw blades, with a shield being dismantled.
Figure 3:
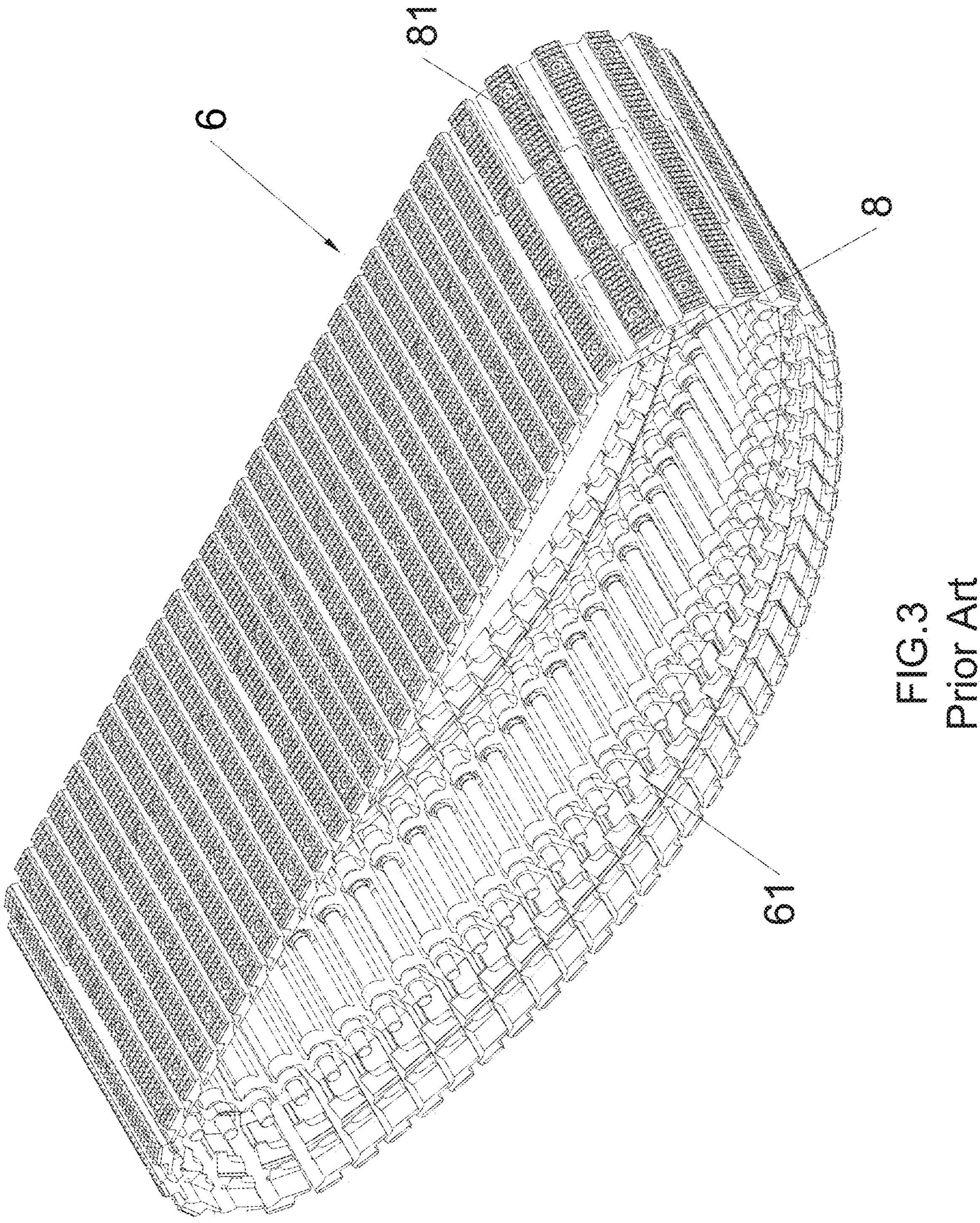
FIG.3 Prior Art
FIG. 3 shows a three-dimensional external view of a conventional delivery device and an all metallic chain seat thereof.
Figure 4:
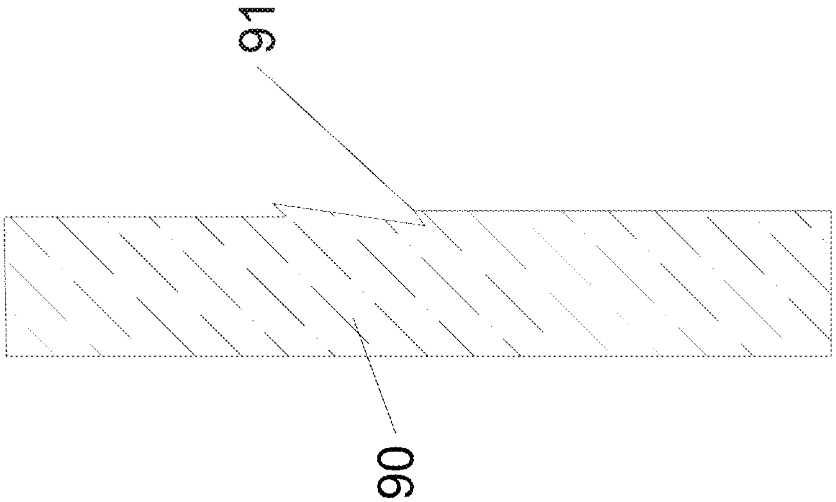
FIG.4 Prior Art
FIG. 4 shows a planar view of saw marks which are formed on a conventional wood board after cutting the wood board.
Figure 5:
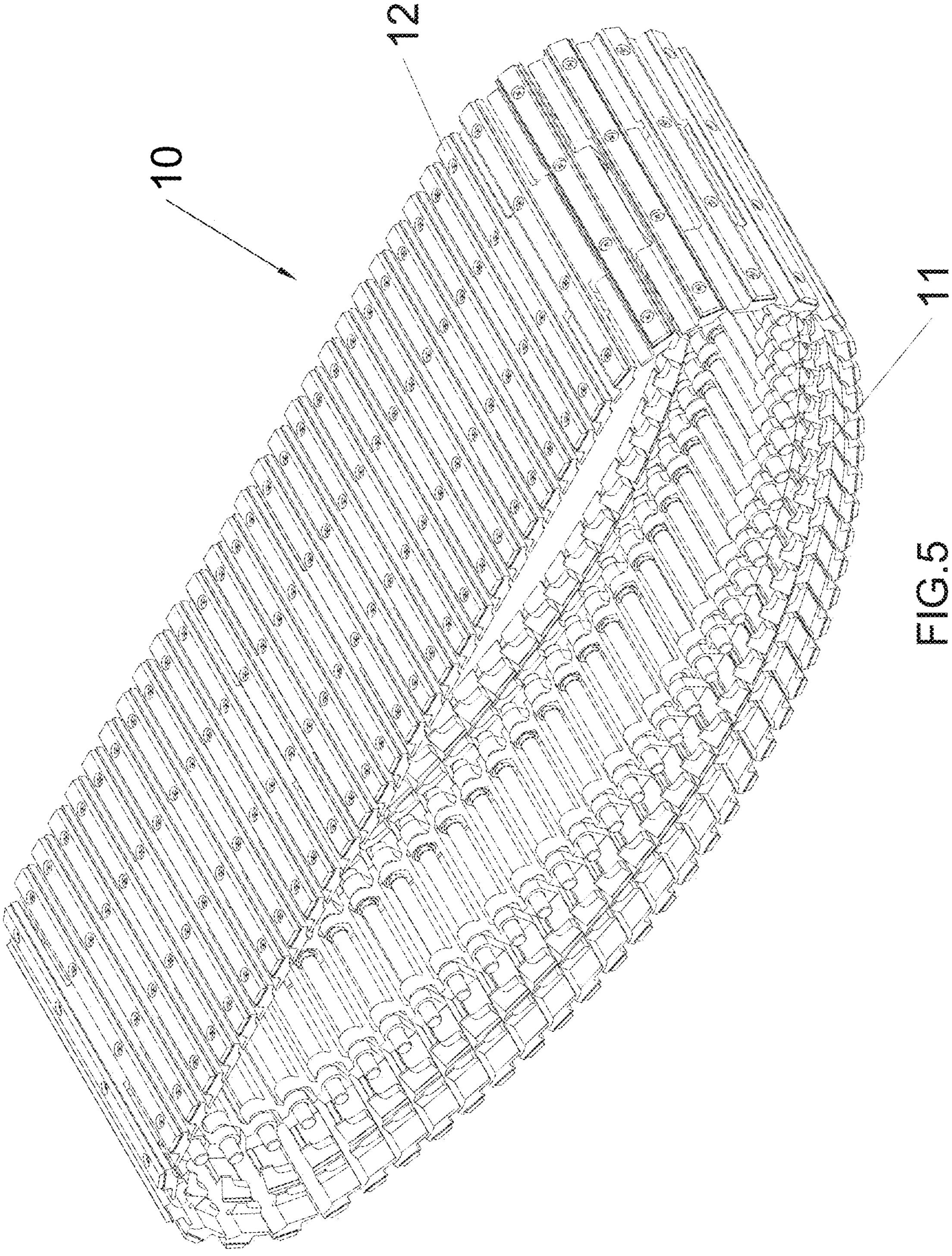
FIG.5 Prior Art
FIG. 5 shows a three-dimensional external view of the conventional delivery device and an all rubber chain thereof.
Figure 6:
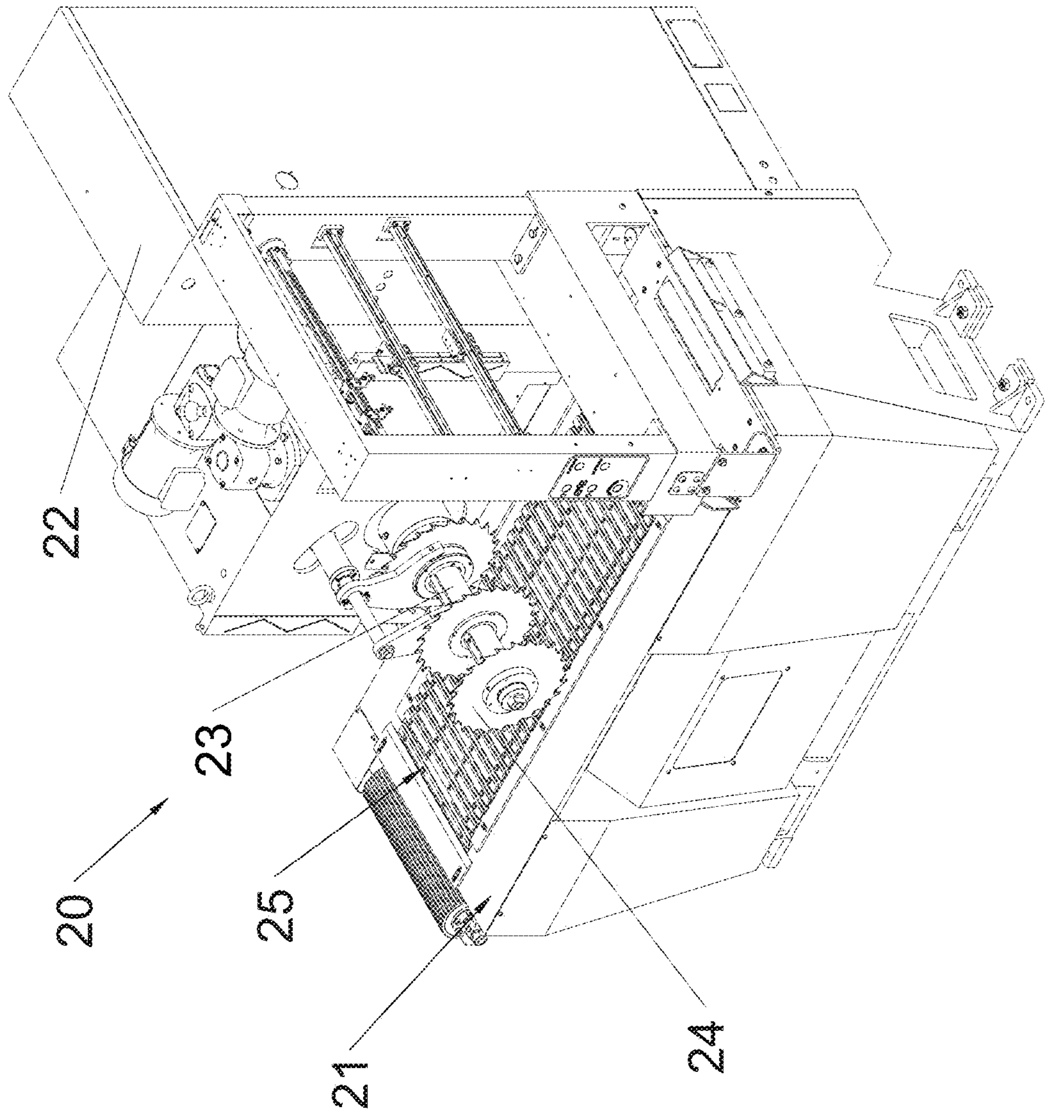
FIG. 6 shows a three-dimensional external view of the present invention after dismantling the shield.
Figure 7:
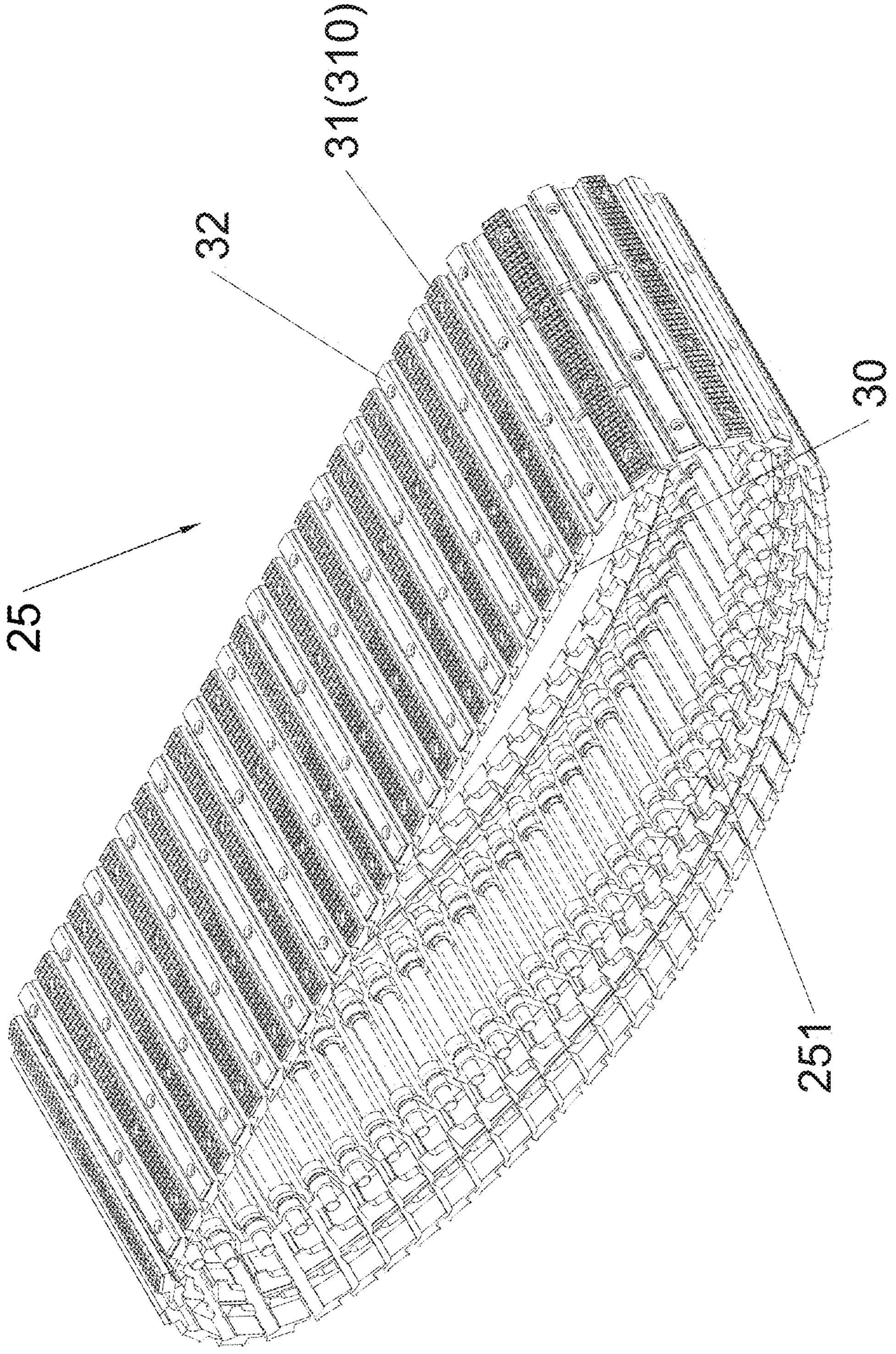
FIG. 7 shows a three-dimensional view of a first embodiment of the delivery device, according to the present invention.
Figure 8:
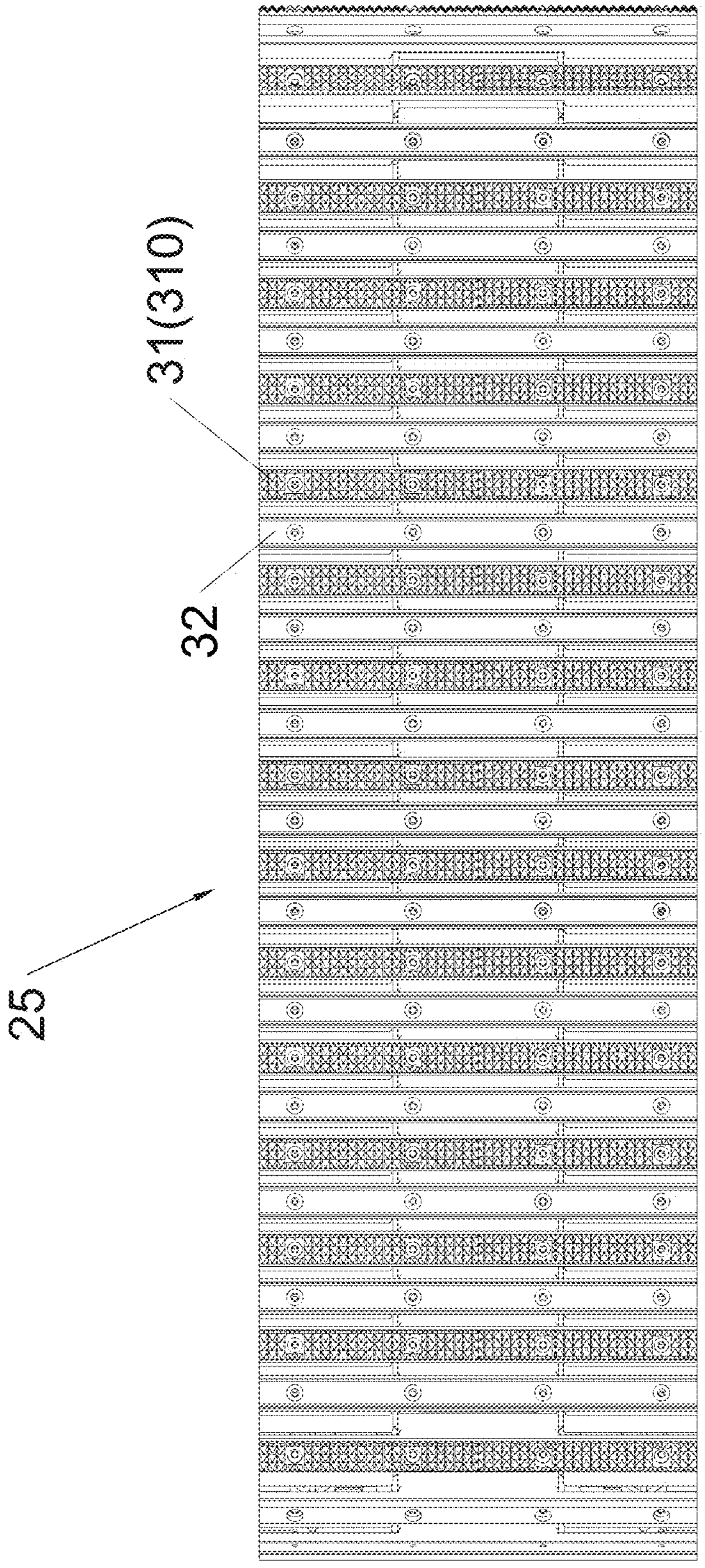
FIG. 8 shows a top view of the first embodiment of the delivery device, according to the present invention.
Figure 9:
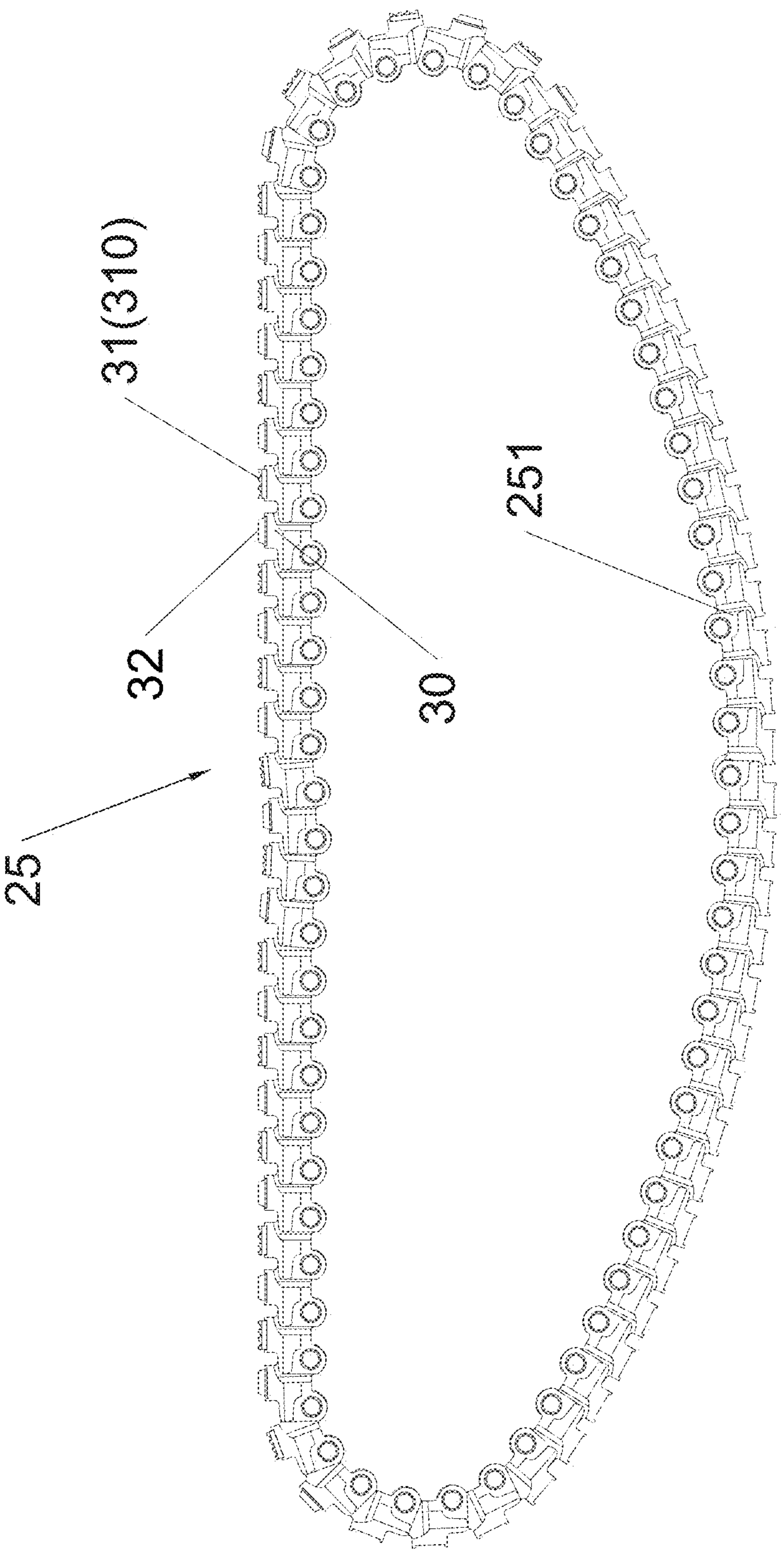
FIG. 9 shows a front view of the first embodiment of the delivery device, according to the present invention.
Figure 10:
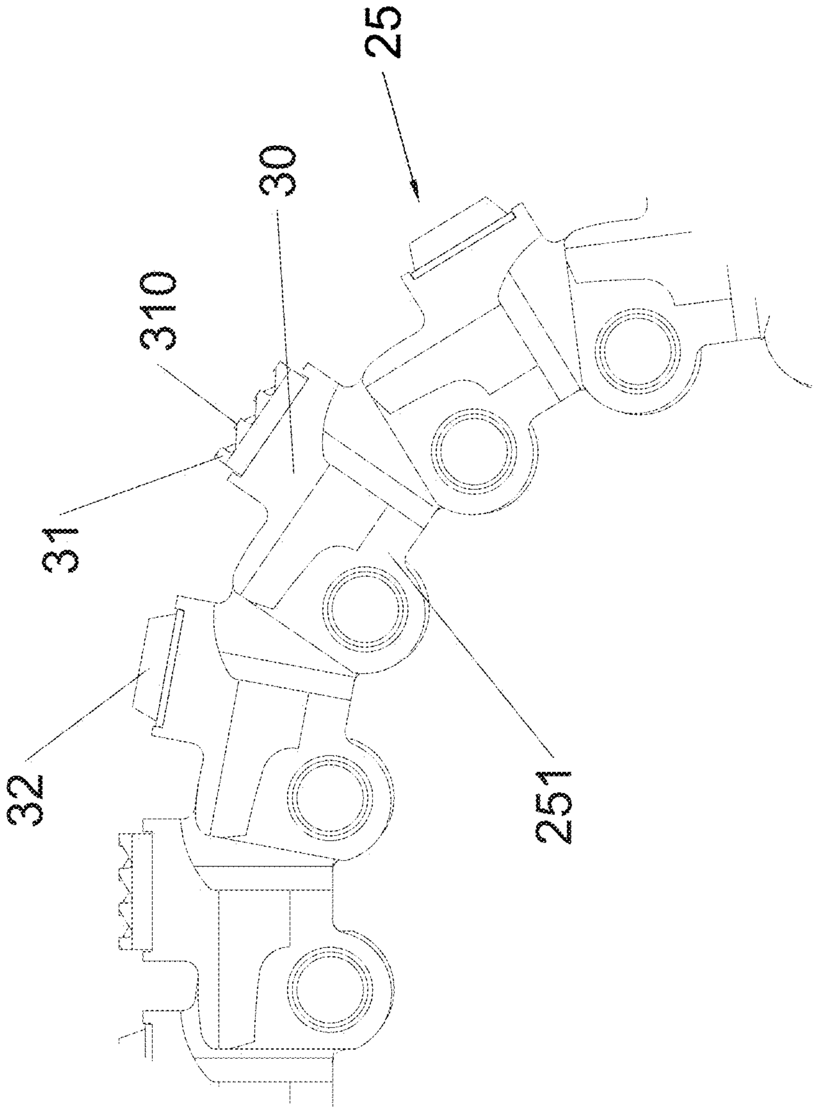
FIG. 10 shows a front view of partially enlarged portion of the first embodiment of metallic chains and non-skid chains, according to the present invention.

Referring to FIG. 6, the present invention is a table 20. The table 20 is provided primarily with a desktop 21, a control device 22, a main shaft 23, saw blades 24 and a delivery device 25. A power device (which belongs to a conventional technology and thus is not shown in the drawing) transmits power to the main shaft 23, the saw blades 24 are mounted on the main shaft 23 and rotate simultaneously with the main shaft 23. A lower side of the saw blades 24 is the delivery device 25, and the delivery device 25 is formed into a loop (as shown in FIG. 7) by pivoting strip-like track units 251 parallel. A surface of each track unit 251 is provided at least with a chain 30, and each chain 30 is locked on the track unit 251. Some chain seats are metallic chains 31 made of metal, and a surface of the metallic chain 31 is provided with teeth 310. The delivery device 25 revolves on the desktop 21 by power and sends wood boards below the saw blades 24. The control device 22 controls the activation of power and detects the speed of wood boards and delivery device 25. The present invention is primarily characterized in that the chains 30 on the track units 251 of the delivery device 25 are combination of non-skid chains 32 and the metallic chains 31, with the non-skid chains 32 being made of rubber. In addition, the area of distribution of the non-skid chains 32 and the area of distribution of the metallic chains 31 are the same on the delivery device 25.

By the abovementioned structures, a first embodiment of the present invention is shown in FIGS. 7 to 10. The surface of a track unit 251 of the delivery device 25 is provided with a metallic chain 31, and the surface of a neighboring track unit 251 is provided with a non-skid chain 32. The metallic chain 31 is next to the non-skid chain 32, the metallic chain 31 covers the entire surface of the track unit 251, and the non-skid chain 32 also covers the entire surface of the track unit 251. With the combination of metallic chain 31 and non-skid chain 32 that are arranged next to each other, the non-skid chain 32 will achieve the effect of anti-slip and anti-vibration, the wood board will not vibrate, no saw marks will be formed on the cutting plane upon cutting the wood board, and there is no need to do a secondary processing to re-smooth the saw marks on the cutting plane. Therefore, as there is no unnecessary secondary processing, it saves time and labor. In addition, because the area of the metallic chain 31 is the same as the area of the non-skid chain 32, the lifetime of use of the non-skid chain 32 can be extended as a half of the area of the chains belongs to the metallic chain 31.

Figure 11:
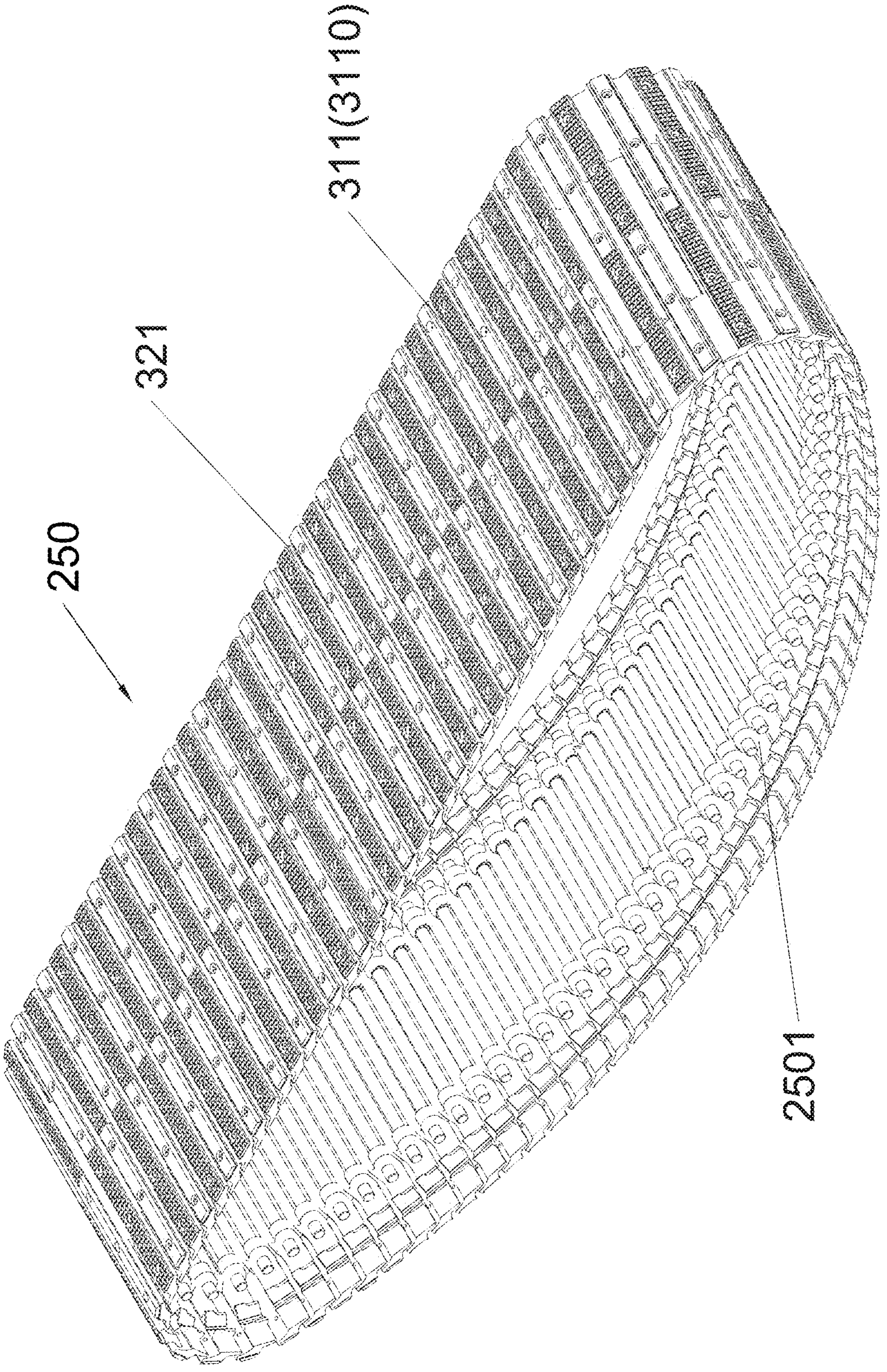
FIG. 11 shows a three-dimensional view of a second embodiment of the delivery device, according to the present invention.
Figure 12:
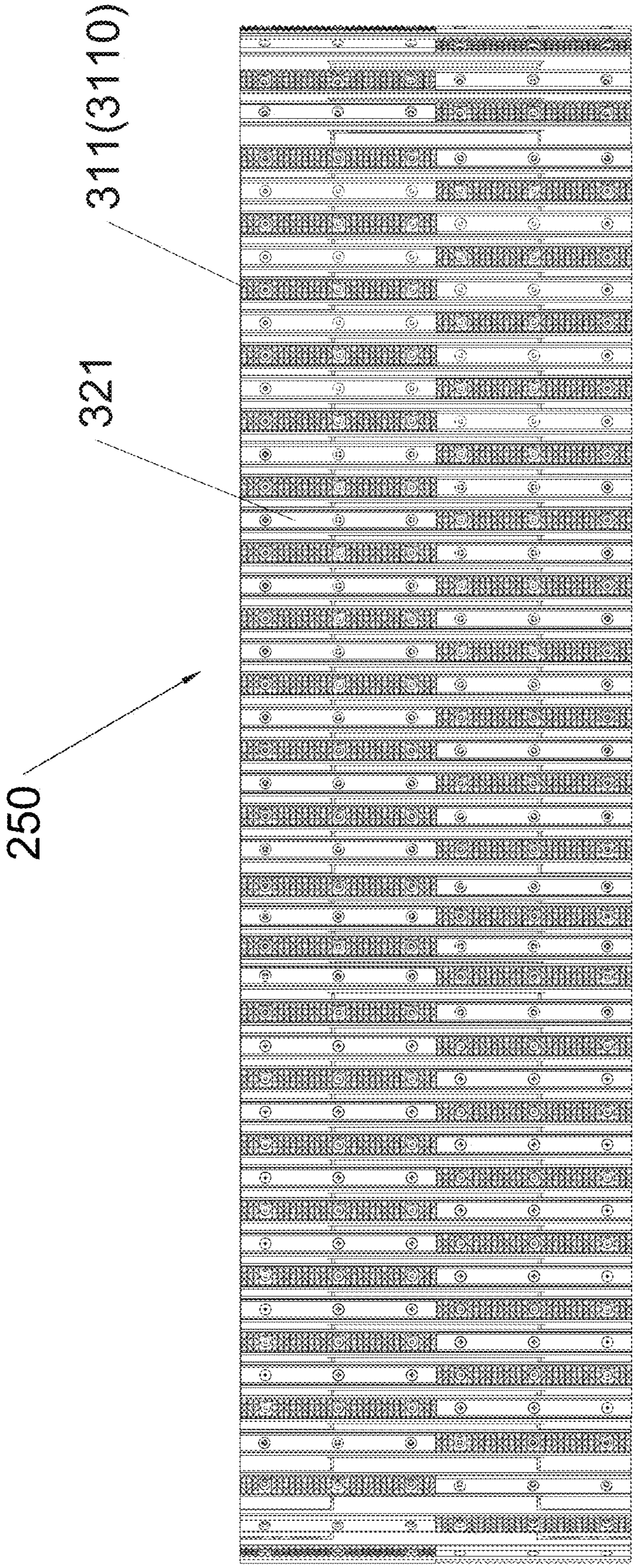
FIG. 12 shows a top view of the second embodiment of the delivery device, according to the present invention.

A second embodiment of the present invention is shown in FIG. 11 and FIG. 12. The surface of a track unit 2501 of the delivery device 250 is provided with a half-length metallic chain 311 and a half-length non-skid chain 321; the half-length metallic chain 311 and the half-length non-skid chain 321 are arranged up-down. The surface of an adjacent track unit 2501 is provided with a half-length non-skid chain 321 and a half-length metallic chain 311; the half-length non-skid chain 321 and the half-length metallic chain 311 are arranged up-down. The surface of the half-length metallic chain 311 is provided with teeth 3110. The half-length metallic chain 311 of a track unit 2501 is next to the half-length non-skid chain 321 of an adjacent track unit 2501, and the half-length non-skid chain 321 of a track unit 2501 is also next to the half-length metallic chain 311 of an adjacent track unit 2501. This means that the surface of every track unit 2501 is provided with the half-length metallic chain 311 and the half-length non-skid chain 321, and the half-length metallic chain 311 and the half-length non-skid chain 321 on the surface of adjacent track units 2501 compensate to each other. Accordingly, the corresponding contact surface of the wood board is pressed by the half-length non-skid chain 321 and the half-length metallic chain 311, and the effect of anti-slip and anti-vibration can be achieved by the half-length non-skid chain 321. The wood board will not vibrate, and there are no saw marks on the cutting plane upon cutting the wood board. In addition, there is no need to do a secondary processing to re-smooth the saw marks on the cutting plane. As the unnecessary secondary processing is removed, it can save time and labor. Furthermore, the area of half-length metallic chain 311 is equal to the area of half-length non-skid chain 321; therefore, a half area of the surface of track unit 2501 is aided by the half-length metallic chain 311, and the lifetime of use of the half-length non-skid chain 321 can be extended.

Figure 13:
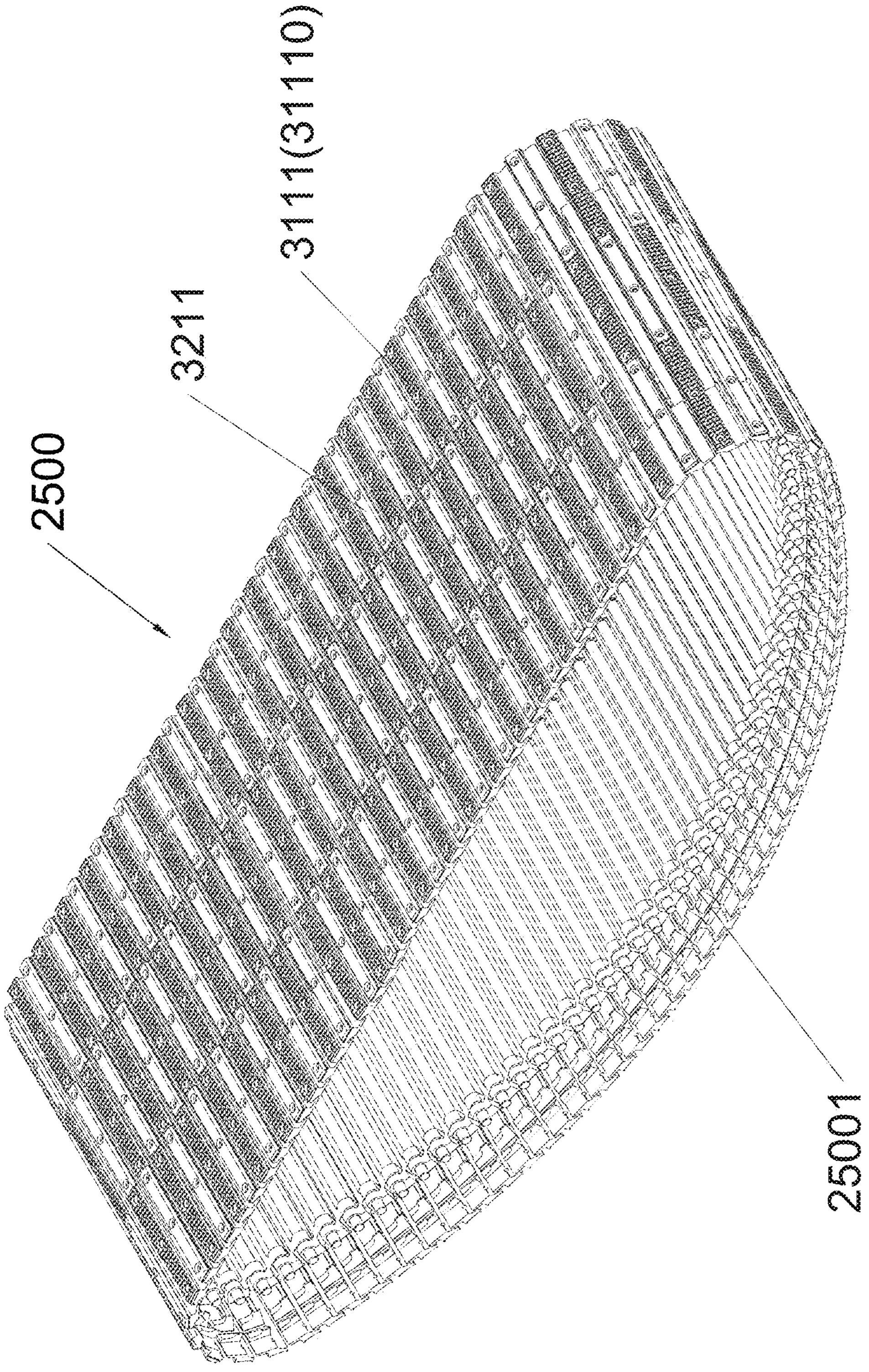
FIG. 13 shows a three-dimensional view of a third embodiment of the delivery device, according to the present invention.
Figure 14:
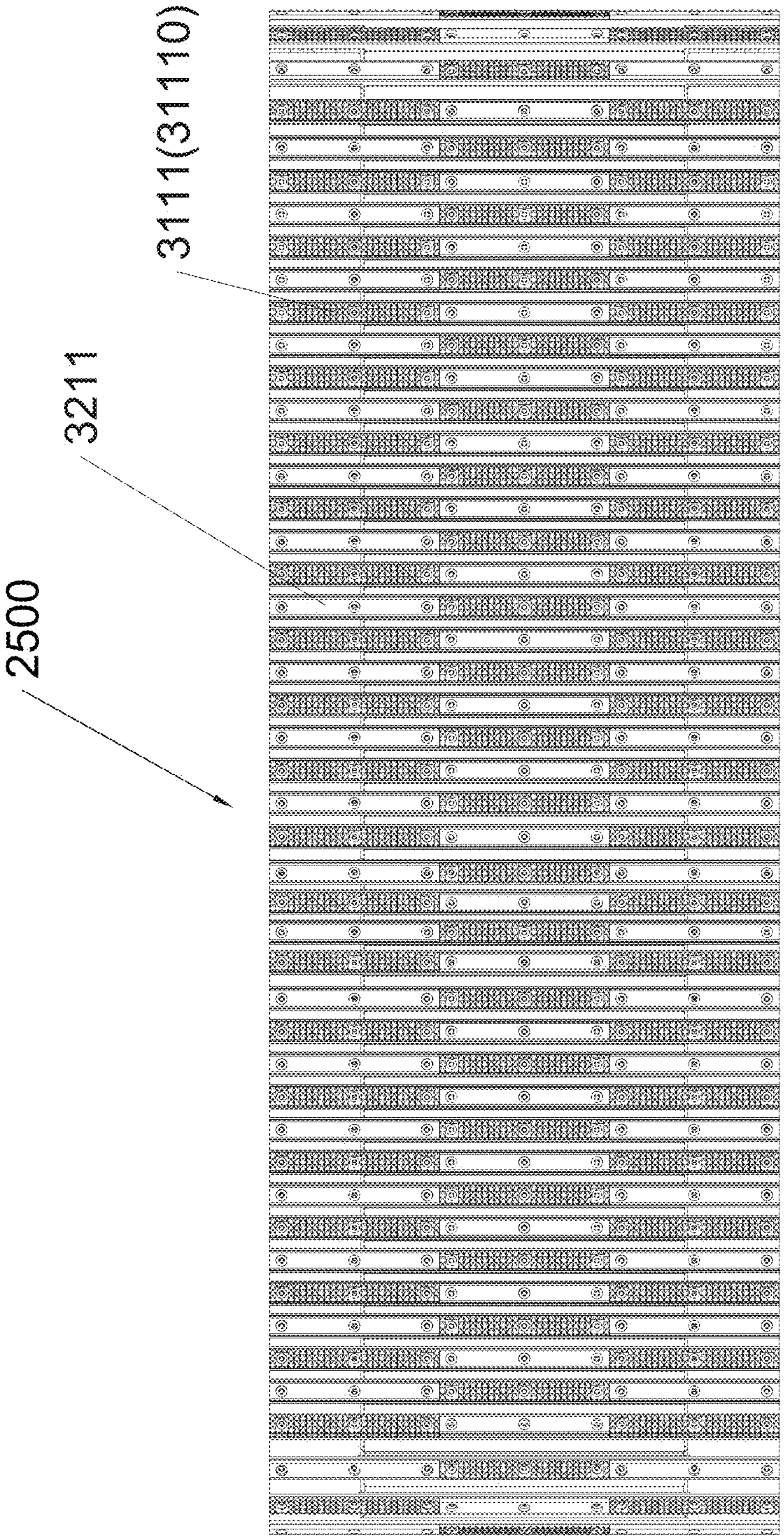
FIG. 14 shows a top view of the third embodiment of the delivery device, according to the present invention.

A third embodiment of the present invention is shown in FIG. 13 and FIG. 14. The surface of a track unit 25001 of the delivery device 2500 is provided with a one-third-length metallic chain 3111, a one-third-length non-skid chain 3211 and a one-third-length metallic chain 3111; the one-third-length metallic chain 3111, the one-third-length non-skid chain 3211 and the one-third-length metallic chain 3111 are arranged top-middle-bottom. The surface of an adjacent track unit 25001 is provided with a one-third-length non-skid chain 3211, a one-third-length metallic chain 3111, and a one-third-length non-skid chain 3211; the one-third-length non-skid chain 3211, the one-third-length metallic chain 3111, and the one-third-length non-skid chain 3211 are arranged top-middle-bottom. The surface of the one-third-length metallic chain 3111 is provided with teeth 31110. The one-third-length metallic chain 3111 on top of a track unit 25001 is next to the one-third-length non-skid chain 3211 on top of an adjacent track unit 25001, the one-third-length non-skid chain 3211 in the middle of a track unit 25001 is next to the one-third-length metallic chain 3111 in the middle of an adjacent track unit 25001, and the one-third-length metallic chain 3111 on bottom of a track unit 25001 is also next to the one-third-length non-skid chain 3211 on bottom of an adjacent track unit 25001. Accordingly, the corresponding contact surface of the wood board is pressed by the one-third-length non-skid chain 3211 and the one-third-length metallic chain 3111, and the effect of anti-slip and anti-vibration can be achieved by the one-third-length non-skid chain 3211. The wood board will not vibrate, and there are no saw marks on the cutting plane upon cutting the wood board. In addition, there is no need to do a secondary processing to re-smooth the saw marks on the cutting plane. As the unnecessary secondary processing is removed, it can save time and labor. Furthermore, as the area of one-third-length metallic chain 3111 is equal to the area of one-third-length non-skid chain 3211, and a half area of the surface of track unit 25001 is aided by the one-third-length metallic chain 3111, the lifetime of use of the one-third-length non-skid chain 3211 is extended.

In the present invention, the conventional all metallic chains or the conventional all rubber chains are replaced by combination of the non-skid chains 32 and the metallic chains 31. The non-skid chains 32 and the metallic chains 31 are arranged next to each other, or the half-length metallic chains 311 and the half-length non-skid chains 321 are arranged alternatingly, or the one-third-length non-skid chains 3211, the one-third-length metallic chains 3111 and one-third-length non-skid chains 3211 are arranged symmetrically top-middle-bottom. The combination can achieve the effect of anti-slip and anti-vibration, and can also extend the lifetime of use of the non-skid chains 32 (half-length non-skid chains 321, one-third-length non-skid chains 3211). In addition, the acute teeth 310 (teeth 3110, teeth 31110) on the surface of metallic chains 31 (half-length metallic chains 311, one-third-length metallic chains 3111) can be also prevented from degenerating into the obtuse teeth 310 (teeth 3110, teeth 31110), which avoids the condition that the wood board cannot be engaged.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. A delivery chain apparatus of a wood-working machine with saw blades, comprising a table which includes a desktop, a control device, a main shaft, saw blades and a delivery device, wherein a power device transmits power to the main shaft, the saw blades are mounted on the main shaft, a lower side of the saw blades is the delivery device, the delivery device is formed into a loop by pivoting strip-like track units, a surface of each of the track units is provided with a plurality of chains, one of the plurality of chains is locked on one of the track units, some of the chains are metallic chains made of metal, a surface of each of the metallic chains is provided with teeth, and the delivery device revolves on the desktop to send wood boards below the saw blades; wherein the chains on the track units of the delivery device are combination of non-skid chains and the metallic chains, with the non-skid chains being made of rubber;

wherein the surface of one of the track units is provided with one of the metallic chains, a surface of an adjacent track unit of the track units is provided with one of the non-skid chains, and the metallic chain is next to the non-skid chain.

2. The delivery chain apparatus of the wood-working machine with saw blades, according to claim 1, wherein an area of distribution of each of the non-skid chains is the same as an area of distribution of each of the metallic chains on the delivery device.

* * * * *